United States Patent Office 3,266,370
Patented August 16, 1966

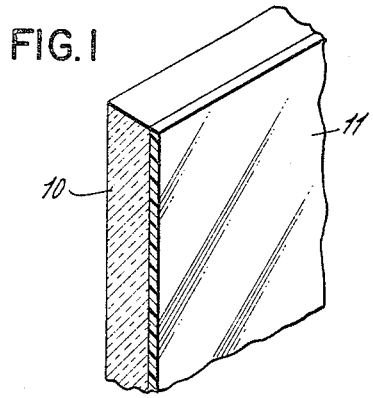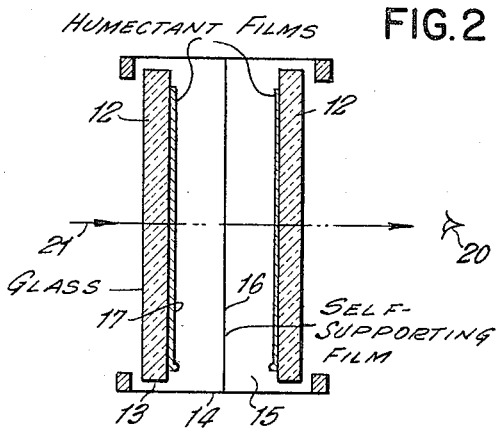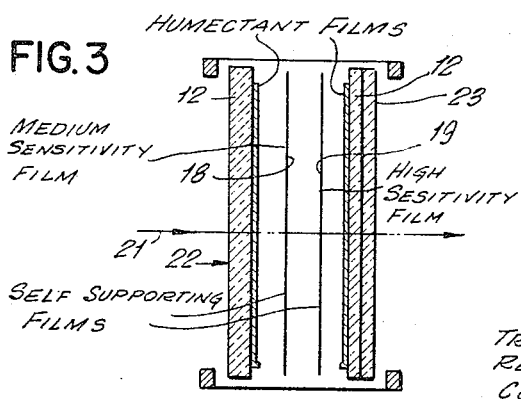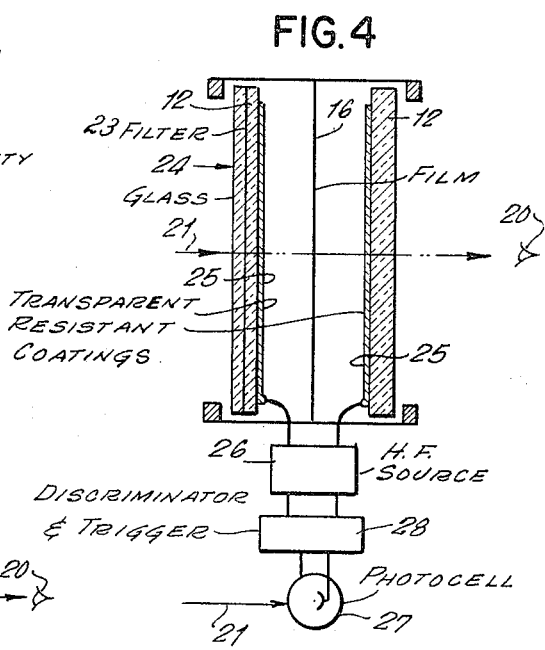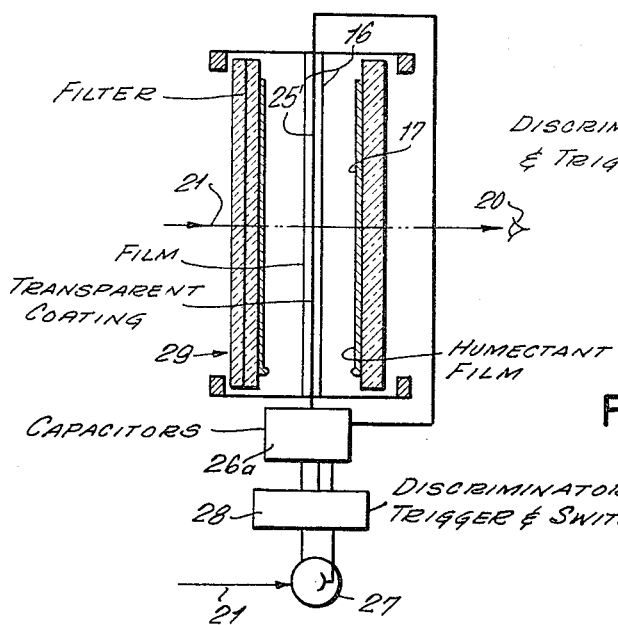

3,266,370
ELECTRO-THERMO-PHOTOTROPIC COMPOSITIONS AND APPARATUS
Alvin M. Marks, 149—61 Powells Cove Blvd., and Mortimer M. Marks, 166—25 Cryders Lane, both of Whitestone 57, N.Y.
Filed Oct. 20, 1960, Ser. No. 63,824
4 Claims. (Cl. 88—61)

This invention relates to phototropic material and apparatus, and particularly to materials and apparatus which will vary in light transmission when exposed to changes in incident light.

Where it is desired to protect human eyes, from sudden blinding flashes of light or the effects of prolonged exposure to intense light it has heretofore been necessary to employ light absorbing spectacles or goggles. However, dark colored glasses absorb light during all periods of use and interfere with vision under normal circumstances. In addition, where the sudden flash is of great intensity, such as that coming from the explosion of a thermo-nuclear bomb, presently known light absorbing materials must be so dark to protect the eyes of personnel that they cannot be used as spectacles or goggles.

Accordingly, it is an object of the present invention to provide phototropic materials and apparatus which will vary the light passing therethrough in response to changes in incident illumination.

Another object of the present invention is to provide phototropic materials which will change from a state of high transparency to one of substantial opacity.

A further object of the present invention is to provide phototropic materials which will change in transmission with sufficient speed to protect the eyes of the wearer against damage from the flash accompanying thermo-nuclear explosions.

Still another object of the present invention is to provide both reversible and irreversible phototropic material.

An object of the present invention is to provide phototropic materials having high sensitivity to changes in ambient light.

A further object of the present invention is to provide a phototropic shutter capable of repeated operation.

Another object of the present invention is to provide a phototropic paper whereby images can be recorded without need for conventional photographic techniques.

An object of the present invention is to increase the sensitivity of phototropic materials by the application of potential and/or heat to the material.

An object of the present invention is to provide a stable phototropic material.

An object of the present invention is to provide phototropic material in the form of thin films which can be incorporated with compact optical assemblies.

Still another object of the present invention is to provide a phototropic material having the behavior of a light polarizing film.

A feature of the present invention is its use of solid solutions of phototropic materials in transparent plastics to form a phototropic foil or layer.

Another feature of the present invention is its use of sensitizers or augmentors in the phototropic films to lower the threshold of response.

A feature of the present invention is its reversible reaction of the phototropic films whereby they opaque in the presence of light and recover their transparency when the light is removed.

A further feature of the present invention is the provision of irreversible phototropic materials useful for photographic purposes.

A feature of the present invention is its use of thin unsupported phototropic films to provide rapid response to light.

Another feature of the present invention is the use of humectant films in conjunction with phototropic films to improve the response of the phototropic film.

A still further feature of the present invention is its use of an independent electrical potential to trigger the opaquing of a phototropic material.

A feature of the present invention is its use of the stretch crystallizing technique to form a light polarizing phototropic layer or film.

Another feature of the present invention is the provision of phototropic cells which can be used as light controlling lenses.

The invention consists of the construction, combination and arrangement of parts, as herein illustrated, described and claimed.

In the accompanying drawings, forming a part hereof are illustrated several forms of embodiment of the invention, in which drawings similar reference characters designate corresponding parts, and in which:

FIGURE 1 is a somewhat isometric view greatly enlarged of a portion of a glass plate having a phototropic layer thereon.

FIGURE 2 is a diagrammatic view of a phototropic cell using humectant films to increase the recovery rate of the phototropic film.

FIGURE 3 is a view similar to FIGURE 2 employing phototropic films of different sensitivity.

FIGURE 4 is a view similar to FIGURE 1 showing the use of electrically conductive films for the application of electrical potential to the cell.

FIGURE 5 is a view similar to FIGURES 1 and 4, in which the conductive film is sandwiched between two phototropic films.

Figure 6:
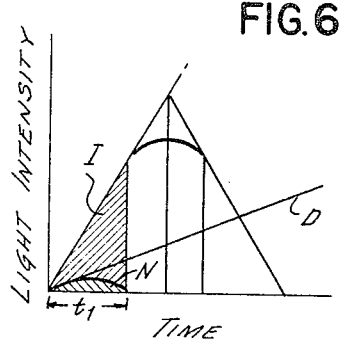
FIGURE 6 is a graph showing the energy released by a photo flash bulb and the effect of a phototropic material made in accordance with the present invention on the light.

Referring to the drawings and particularly to FIGURE 1, 10 indicates a sheet of transparent material such as glass, plastic or the like having a layer of film or phototropic material 11 thereon.

The term phototropic material as used herein refers to a substance or composition which will change in color or opacity upon exposure to light.

The term reversible phototropic material as used herein means a substance or composition which will change in color or opacity when exposed to light and which will return to its original condition when the light is removed. This latter state is also referred to as "relaxation."

The term irreversible phototropic material as used herein refers to a material which will not return to its original state following a change in color or opacity due to exposure to light.

PHOTOTROPIC PLASTIC MATERIALS

It has been found that certain metal halides as for example, the chlorine and bromide salts of copper, nickel, iron and cobalt, dissolve to form a solid solution in a plastic matrix such as the polyvinyl alcohol-acetate copolymers show strong reversible phototropic effects. A strong relationship of opaquing rates and relaxation rates exists depending upon the chemical structure of the plastic matrix and the concentration of metal halides, indicating that the molecular structure of the polymer is a necessary cooperating component of the phototropic reaction together with the metal halides. The behaviour of such compositions is all the more surprising since neither the metal halides nor the polymers by themselves show phototropic properties. These pototropic properties are due to changes in bonding or quantum levels within the structure of the solid solution and which may be reversible or irreversible.

The plastic films are not merely inert vehicles for the phototropic metal halides but rather take a definite part in the reaction. Thus, using the same metal halides some plastic materials show a faster response to light than others. Some resins which show good photosensitivity toward opaquing, make the reaction irreversible.

A typical example of a phototropic plastic material is as follows:

|  | Solids, Percent | Total, Percent |
| --- | --- | --- |
| Formula 1: |  |  |
| Plastic | 90–70 | 25 |
| Metal Halide | 10–30 |  |
| Solvents |  | 75 |
|  | 100 | 100 |
| Example 1, using cupric chloride: |  |  |
| Polyvinyl Alcohol-Acetate (Shawinigan Resin Co. D381) | 14.5 | 72.5 |
| Cupric Chloride, hydrate | 5.5 | 27.5 |
| N-propanol | 35.0 |  |
| Methanol, 95% | 40.0 |  |
| Water | 5.0 |  |
|  | 100.0 | 100.0 |

Solids=20%.

The solvent employed depends upon the solubilities of the different materials, and a mutual solvent is selected for all of them.

Preferably, all of the mixture is added to a one liter container which is stoppered and heated for twelve hours at about 70° C. Thereafter, the mixture is homogenized by shaking for fifteen minutes in a standard paint agitator machine. The mixture is allowed to stand for about an hour to eliminate bubbles, then coated on a suitable glass plate, approximately 0.0004" thick.

The plastic is next cured by allowing the excess of solvent to evaporate from the plate while being heated to 70° C. for one half hour to twelve hours.

Various total thicknesses can be obtained by increasing the number of coatings and by controlling the solution viscosity. From one to twenty coats have been employed.

The high molecular weight D381 and low molecular weight D383 (Shawinigan Resin Co.) polyvinyl acetate-alcohol copolymers containing about 70% acetate groups and 30% hydroxyl groups produce a stable solid solution with copper chloride that does not readily break down. In addition, the copper chloride is strongly bound to the plastic matrix.

Thin films of the order of .0003" have a peak opaquing rate at about 460 mu, intermediate thickness films of the order of .0059" have a peak rate at about 510 mu and the thick films .0097" have a peak rate of opaquing at 570 mu. The peak relaxation rate occurs at approximately the same position as the peak opaquing rates for all thicknesses.

Example 2, using cupric bromide

Cupric bromide may be substituted for the cupric chloride in the above formula. The resulting composition is less effective as to rate of opaquing than the cupric chloride for a film of given initial transmission but more easily worked since a much higher concentration of cupric chloride is required to obtain the same result. Cupric chloride requires approximately 13.4 times the product of film thickness and concentration to achieve maximum results.

The cupric bromide requires much less material to obtain the same change as the cupric chloride because it is sensitive to a wider wave-length band of light, and also permits the passage of light throughout a wider range of wave-length. For cupric chloride films the phototropic effect is very much reduced, to almost zero, beyond 600 mu. Cupric bromide films display a maximum phototropic effect at 700 mu and extend into the infra-red, at least up to 1000 mu.

Cupric bromide is highly soluble in the polyvinyl alcohol-acetate copolymer D381. This material forms an intensely brown colored film with a single coat thickness of 0.0001", having an initial transmission of 28% at a concentration of 30.5% cupric bromide.

A film prepared according to this formula was so sensitive that exposure to sunlight gave the following result:

| | Percent |
| --- | --- |
| Initial white light transmission | 15 |
| After one-minute exposure | 12 |
| After two-minute exposure | 11 |

Rate of decrease 20% per minute.

| | |
| --- | --- |
| Recovery—one minute | 12 |
| Recovery—two minutes | 13 |

Dark rate of relaxation 10% per minute.

Example 3, using cupric bromide and cupric chloride

A film similar to that set forth in Example 2 may be prepared using 80% to 90% cupric bromide and 10% to 20% cupric chloride. Such a film when exposed to sunlight gave the following results:

| | Percent |
| --- | --- |
| Initial white light transmission | 45 |
| After one-minute exposure | 37 |
| After two-minute exposure | 30 |

Rate of decrease 17.7% per minute.

| | |
| --- | --- |
| Recovery—one minute | 32 |
| Recovery—two minutes | 39 |

Dark rate of relaxation 15% per minute.

The brown color of cupric bromide is so intense that a range of transmissions can be achieved by simply diluting the composition with more solvent and producing thinner films.

Combinations of cupric chloride and cupric bromide in polyvinyl alcohol acetate copolymer in varying proportions using molar ratios of the two salts disclosed a peak efficiency at 80% cupric bromide with 20% cupric chloride. This mixture is 1.5 times as efficient as cupric chloride or 1.2 times as cupric bromide used alone in the film.

The efficiency of these mixtures of salts is believed due to their complementary absorption of light energy. The added salt absorbs energy in frequencies not used by the first salt.

Example 4, using cupric chloride and polyvinyl-alcohol

An irreversible film can be made by preparing a cupric chloride polyvinyl alcohol (from 60 to 100% OH) composition and casting it in the manner hereinabove set forth. Upon exposure to light this film will darken and remain dark even though the light is subsequently removed. This behaviour is in contrast with the reversible copolymer of polyvinyl alcohol-acetate (30% OH–70% acetate) known as D381 employed in Examples 1–3.

Films made in accordance with Examples 1–3 show strong phototropism with substantial opaquing rates under stood that the spacing between the films 16, 17, shown in FIGURES 2–5 and 10, is purely by way of illustration and that the actual spacing of these elements will be much less in the interest of size requirements and rapid response of the order of ⅛ inch on each side of the film 16.

The presence of water in the phototropic films described herein is important in both the rates of opaquing and relaxing. There is an optimum percentage of water which must be present for the maximum opaquing and relaxing rates. When a very thin phototropic film is subjected to a burst of energy such as a photoflash lamp, drying occurs simultaneously with the increase of temperature. The humectant films however give off enough moisture to keep the phototropic film 16 at its peak activity. Since the cell is sealed there is no loss of water from the assembly during the life of the device. Cells made in accordance with the structure of FIGURE 2 are capable of responding to a flash of light as for example, the energy from a No. 5 photoflash lamp (20,000 lumen-seconds—24 watt seconds) or 0.257 gm. cal./cm.$^2$ striking the film at 18 cm. distance from flashbulb and reflector with complete opacity in 10 milliseconds. The relaxation rate is also rapid, returning to initial transmission of 40% in 30 seconds. With a flash duration of 30 milliseconds the blackout was faster than the flash. Only 10% of the total energy which would have reached the eye traversed the cell.

Referring to FIGURE 3 there is shown a modification 22 of the cell shown in FIGURE 2. In this modified cell two phototropic films 18, 19, are disposed in the area 15 between the plates 12. The more sensitive film 19 is placed closer to the eye 20 to be protected. A less sensitive film 18 is placed closer to the light source. When incident light indicated by the arrow 21 enters the cell 22 the more sensitive film 19 will opaque first. After darkening, further absorption of energy by the film 19 would cause "burn out" resulting in a condition of permanent opacity. However, before the sensitive film 19 can be destroyed the film 18 begins to opaque and protects the film 19.

A filter 23 capable of absorbing ultraviolet or infrared rays may be incorporated into the phototropic cell 22 on the exit side thereof to protect the eye from these non-visible but destructive forms of radiant energy.

In FIGURE 4 there is shown a phototropic cell 24 which is capable of intense and rapid reaction in response to a low intensity light source. The cell consists of the spaced plates 12 and unsupported film 16 described in connection with FIGURE 2. The inner surfaces of the plates 12, however, are coated with any of the well known transparent conductive coatings 25. A high frequency potential source such as an oscillator 26 is connected to the coatings 25. Light from an external source indicated by the arrow 21 is received by a photo cell 27 and activates a discriminator, and trigger 28 which in turn activates the oscillator 26. The oscillator 26 applies a voltage through the conductive coatings which rapidly heat up and heat the film 16 thereby opaquing the phototropic film. The opaquing effect results from the fact that phototropic films made in accordance with the above formula are also thermotropic and respond to the total incident energy whether the energy be in the form of light or heat. By using the apparatus of FIGURE 4, therefore, the initial weak light at the beginning of a flash can be used to trigger the phototropic film and cause it to opaque.

In the embodiment shown in FIGURE 4 the filter 23 may be disposed on the plate 12 facing the light source (not shown) to protect both the film 16 and the eye 20, since the cell is triggered by external photo sensors and is not activated directly.

FIGURE 5 illustrates a phototropic cell 29 similar to that shown in FIGURE 4 except that in this embodiment an electrically conductive coating 25 is disposed directly upon the inner surfaces of the phototropic films 16. The coating 25′ is connected to the capacitor 26a. A photo-cell 27 and discriminator 28 control the switches of the charged capacitor 26a which serve to heat the films 16 within micro-seconds upon the application of the potential. The humectant films 17 described above in connection with FIGURES 2 and 3 are also used in the cell 29 and for the same purpose, namely, to improve the speed of relaxation of the cell after opaquing by controlling the amount of water in the film 16.

Figure 9:
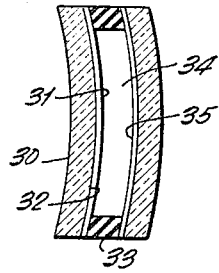
FIGURE 9 is a somewhat diagrammatic view in cross-section of a phototropic cell made into the form of a lens, a further embodiment of the present invention.

While the cells illustrated in FIGURES 2 through 5 have been shown with flat plates 12 it is within the purview of the present invention to form the cells with curved walls as shown in FIGURE 9. In this form of the invention the film supporting transparent plates may be spaced lens members 30 made of transparent glass, plastic or the like. A phototropic film 31 such as hereinabove described may be deposited on one or both inside surfaces 32 of the lens members 30. A gasket 33 is inserted between the lens members 30 to form a sealed chamber 34 therebetween. It is within the purview of the invention to cover one of the inner faces 32 of the lens members 30 with a humectant film 35 in lieu of a second phototropic film.

RESPONSE OF PHOTOTROPIC FILMS

Figure 7:
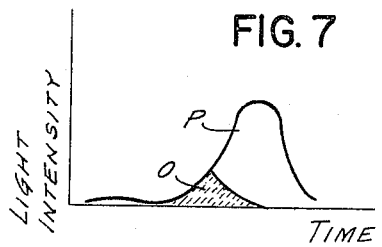
FIGURE 7 is a graph showing the difference between the transmission through a conventional filter and a phototropic device made in accordance with the present invention.
Figure 8:
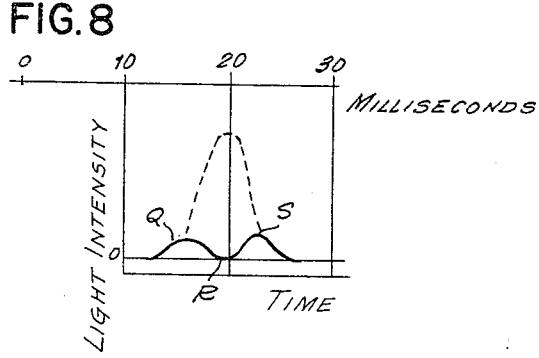
FIGURE 8 is a graph showing the effect upon transmission through a phototropic film when carried to the burn-out phase.

In FIGURES 6 through 8 there are shown curves showing the response curves of phototropic films made in accordance with the present invention.

FIGURE 6 shows an idealized time-light curve made by a flash-lamp, through a phototropic film having an initial transmission of 25%. The line D whose slope is 0.25 plots transmitted light intensity versus time for this transmission. Tangent to this slope is the curve of light intensity transmitted through the phototropic film. The shaded area N shows the intergraded amount of light energy transmitted during the time $t_1$ through the phototropic film (initial transmission 25%). The shaded area I is the total light energy striking the phototropic film during the same time $t_1$.

In FIGURE 7 there are shown two curves superimposed to show the transmission through a non-opaquing film as compared with a phototropic film of the same initial transmission. The area O below the curve P is shaded to show the relative energy absorbed by the phototropic film, for this case, approximately 90%. The unshaded area of the curve P shows the transmission through the non-opaquing filter.

FIGURE 8 illustrates the curves made by an unobstructed flash and a phototropic film which is placed so close to a photoflash bulb that it eventually burns out. It will be seen from this graph that the opaquing occurs first, thereafter subsequent heating of the film causes the transmission to rise again due to burn-out. This graph shows two peaks and establishes the duration of the flash. It also establishes that the phototropic film acted faster than the flash. The curve represented by the dashed lines is a graph for the unobstructed flash. In FIGURE 8 the intensity of the transmitted light has reached its peak at Q and begins to diminish due to the opaquing of the film. The opaquing is total and the transmitted intensity is zero at R where the film has provided total protection for the eye. The film then absorbs more energy than it can withstand and burns out, whereupon the intensity rises again until the peak ebbs. At this point the incident light of the flash bulb is decreasing.

PHOTO-THERMOTROPIC AUGMENTORS

Certain other materials have been found which exhibit both phototropic and thermotropic behaviour when incorporated into a polyvinyl alcohol acetate copolymer film either by themselves or as augmentors in the phototropic films hereinabove described.

Such materials are ferric chloride, ferric bromide, cobaltus chloride, cobaltus bromide, nickelous chloride, 2500° K. light sources and satisfactory relaxing rates in the dark. These reactions are repeatedly reversible. The phototropic reactions of cupric chloride and cupric bromide in the plastic matrix are in the center of the visible spectrum and of the order of 30% initial transmission down to .001%. It has been found that high color temperatures of the light stimulus, rich in the blue-green regions accelerate the response to light. A single flash in the millisecond range from a photoflash lamp of 3800° K. color temperature is sufficient to completely darken the film. At night levels of illumination there is no noticeable darkening of the films. However, in sunlight, the darkening is substantially proportional to intensity.

The phototropic reaction is also simultaneously thermotropic, a phenomenon which will be hereinafter more fully discussed.

HALOGEN SALT AUGMENTORS

Small percentages of halogen salts such as sodium bromide, potassium bromide and particularly stannous chloride when added to the above examples have increased the sensitivity of the phototropic films up to 6 times and their transmittance up to 3 times.

Other materials such as phosphoric acid when added to the phototropic films herein described show a steady increase in sensitivity with an increase in transmittance. As the presence of the phosphoric acid is increased to a maximum of 43% the sensitivity increases about 4 times, correspondingly the transmittance increases about 3 times.

Highly satisfactory phototropic films incorporating augmentors may be cast from the following compositions:

*Example 5*

| Constituents | Amounts | Solids | Percent Solids |
| --- | --- | --- | --- |
| Methanol | 65 | | |
| N-propanol | 65 | | |
| Ethyl Acetate | 2 | | |
| H$_2$O | 5.5 | | |
| D381 (Polyvinyl Alcohol-Acetate) | 14.5 | 14.5 | 44 |
| CuBr$_2$ | 7 | 7 | 21.2 |
| H$_3$PO$_4$ | 10 | 10 | 30.3 |
| KBr | 1 | 1 | 3.0 |
| SnCl$_2$ | 0.5 | 0.5 | 1.5 |
| Total | 170.5 | 33.0 | 100.0 |

Percent solids = $100 \frac{33.0}{170.5} = 18.85$.

The term "sensitivity" as used herein means a measurement of the time rate of decrease of transmittance per unit of absorbed intensity.

*Example 6*

| Constituents | Amounts | Solids | Percent Solids |
| --- | --- | --- | --- |
| Methanol | 140 | | |
| N-propanol | 140 | | |
| Ethyl Acetate | 7 | | |
| H$_2$O | 19.2 | | |
| D381 | 50.6 | 50.8 | 45.3 |
| CuBr$_2$ | 24.5 | 24.5 | 21.7 |
| H$_3$PO$_4$ | 35 | 35 | 31.0 |
| KBr | 1 | 1 | 0.8 |
| SnCl$_2$ | 0.5 | 0.5 | 0.4 |
| MnBr$_2$ | 1 | 1 | 0.8 |
| Total | 419.0 | 112.8 | 100.0 |

Percent solids = $100 \frac{112.8}{419.0} = 26.9$.

In adding sodium bromide to the composition the sensitivity increases from 10 to a peak of 14 as the sodium bromide increases from 0 to 2%. Above 2% the sensitivity of the film to radiation again decreases, so that at 8% sodium bromide additive the sensitivity has decreased to 7.5.

The transmittance increases from 22% for 0% sodium bromide to 36% for 2% sodium bromide. However, the transmittance again decreases, down to 21% if the sodium bromide concentration is increased from 2% to 8%.

The addition of potassium bromide to the composition is similar in effect to the results obtained with sodium bromide. Starting with a sensitivity of 10 for 0% potassium bromide, the sensitivity increases to a peak of 21.5 for 1% potassium bromide, and thereafter decreases to 17 for 4.5% potassium bromide.

The transmittance also follows the increase in potassium bromide going from 31% at 0% potassium bromide to 61% at 1% potassium bromide. The transmittance is at a peak when the sensitivity is greatest. The relationship of transmittance with sensitivity is approximately linear.

In the case of stannous chloride as an augmentor, the initial sensitivity which was 21% for 0% stannous chloride increased to a peak of about 120 for 0.75% stannous chloride and then decreased rapidly to a sensitivity of 6 at about 8.5% augmentor. Here, again transmittance increases approximately linearly with sensitivity.

The transmittance increases from about 68% with 0% stannous chloride up to about 85% with 1% stannous chloride. Using stannous chloride as an augmentor the ratio of initial sensitivity to peak sensitivity is approximately 6/1.

The effect of phosphoric acid (H$_3$PO$_4$) is to increase sensitivity and transmittance in phototropic films made in accordance with the present invention. Using a D381 resin (polyvinyl alcohol-acetate copolymer) which has approximately an equal distribution of hydroxyl and acetyl groups it was found that sensitivity of the finished film increased from about 12 for 0% phosphoric acid, to about 20 for 28% phosphoric acid. The sensitivity is again doubled from 20 to 40 for an increase of from 28% to 43% phosphoric acid.

Polyvinyl acetate resin (AYAA, Union Carbon and Carbide) which has a substantial majority of acetyl groups as compared to hydroxyl groups was substituted for D381 and phosphoric acid added with the result that the sensitivity increased from 7.5 for 0% phosphoric acid to 12 for 30% phosphoric acid. However, for the AYAA resin there is a considerable change in the percent of transmittance which varies from 14% for 0% phosphoric acid to 64% for 30% phosphoric acid. The phosphoric acid therefore has a greater effect on transmittance than does the nature of the polymer.

The sensitivity is increased approximately proportionately in both the AYAA and D381 copolymer. However, since the D381 copolymer produces the greatest initial sensitivity the sensitivity with the D381 plus phosphoric acid polymer is much greater.

PHOTOTROPIC CELLS

The structure shown in FIGURE 1 coated with compositions hereinabove described will provide opaquing rates of the order of 60 to 70 for light intensities equal to 9 cals./cm.$^2$/min., where sensitivity is 7 to 8. However, by preventing water from being lost by the film reversibility of the film is improved and by employing thin self supporting films of phototropic material the speed of response has been greatly increased. In addition, the application of heat to the film has made it possible to opaque the film at lower levels of illumination.

Apparatus in the form of phototropic cells to increase the speed of response of the phototropic film are shown in FIGURES 2–5 and 10.

In FIGURE 2 there is shown a structure hereinafter referred to as a cell consisting of spaced transparent plates 12 sealed around their edges 13 by a strip 14 to enclose a volume 15. A phototropic film 16 is secured at its edges to the strip 14 and is otherwise unsupported within the volume 14 of the cell. The film 16 is of a thickness of the order of 0.3 to 0.6 mils. A humectant film 17 is carried on the inner surface of each plate 12 facing the phototropic film 16. It wil lbe under-nickelous bromide, chromic chloride, chromic bromide. These materials can be incorporated into a film in mixtures of up to 30% with 70% polyvinyl alcohol-acetate copolymer. Where these photo-thermotropic augmentors are used with the films of Examples 1–6, they are added in amounts from ½ to 10%.

LIGHT POLARIZING PHOTO-THERMOTROPIC FILMS

It has long been known that high molecular weight linear molecular polymers could be crystallized by stretching to elongate the structure. The result is to draw the linear molecular molecules parallel whereupon they crystallize together.

Various materials may be intermixed with the polymer, and upon stretch crystallizing, these materials are often intercrystallized with the polymeric structure.

The phototropic films which have been described hereinabove have been in the amorphous or disoriented condition. In this state, the molecular chains are disposed at random throughout the structure. High molecular weight theory suggests that these chains form microcrystallites which are locally crystallized regions where a number of chains come together and form a small microcrystalline area. These polymeric microcrystallites were in randon orientation throughout the film structures thus far described.

Figure 10:
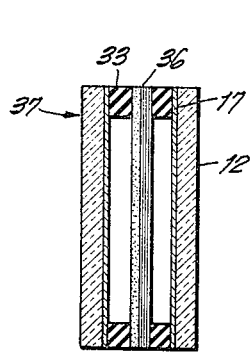
FIGURE 10 is a view in diagrammatic cross-section of a phototropic cell using light polarizing phototropic material.
Figure 11:
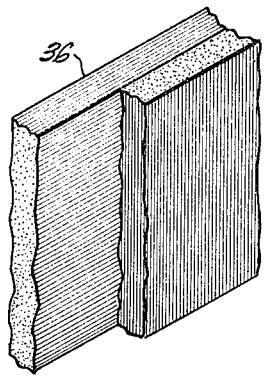
FIGURE 11 is a fragmentary view somewhat enlarged of the phototropic light polarizing material shown in FIGURE 10.

In FIGURES 10 and 11, there are shown somewhat digrammatically photo-thermotropic films which have been stretched-crystallized or oriented by stretching the thread-like molecules into parallel relationship. In effect, the stretch-crystallized film forms one large continuous crystal which exhibits strong polarizing effects when in the strongly absorbing opaque condition. The plane of polarization of the structure is parallel to the direction of stretch which means that the electric vector is absorbed in the direction of the stretch. The plane of polarization has been indicated by the parallel lines in FIGURE 11. The vibration of electrons during light absorption by the films should be parallel to the direction of stretch, but not at right angles to the direction of stretch.

In the preparation of photo-thermotropic polarizing films, the films were cast from a thin transparent film upon a glass plate. The cast film was then slit to form a strip by cutting two parallel lines along the film on the glass. One edge of the film was lifted off and the film pulled away from the plate at an angle of about 15° to the surface. The film was thereby elongated by a factor of about 4 to 6 times. The elongated film was then laid over a supporting frame whereupon the film was self-supported along the edges only, leaving the central portion of the film elongated and without support. As an altered structure the film was laid upon a thin transparent supporting plastic backing or on a thin glass plate.

When the stretched crystallized film is dark-relaxed and has a high initial transmittance, there is no polarizing effect on transmitted light. However, when the stretched crystallized film has been strongly opaqued by intense illumination, it becomes strongly dichroic. Light transmitted through the opaque film is then strongly polarized.

When the photo-thermotropic films have been stretched-crystallized, and opaqued by light or heat they become opaque only to the resolved electric vector parallel to the stretched axes, but readily transmit the resolved electric vector normal to the stretch axes. When two of the dichroic opaqued films are placed with their stretch axis at right angles, as shown on FIGURES 10 and 11, substantially all light is absorbed. Two such films with stretched axes crossed, may have a non-polarizing initial transmittance of between 60 and 80%. However, when opaqued the combined film transmittance may be down to 0.01% to 0.001% (optical densities 4 and 5 respectively).

Two such stretch-crystallized films laminated together will have a higher ratio of initial to final transmittance than is possible with an amorphous film for the same mass per unit area of active thermophototropic material.

In FIGURE 10, there is shown a film 37 incorporating the crossed stretched-crystallized film 36 therein. In this cell the spaced glass plates 12 are provided with humectant films 17 in the manner previously described. A gasket 33 is inserted between the plates 12 and the stretched thermo-phototropic films 36. When exposed to intense radiation this cell 37 provides a more efficient opaquing result than can be obtained using the amorphous or randomly disoriented structure hereinabove described.

IRREVERSIBLE THERMO-PHOTOTROPIC MATERIALS

Certain applications such as single use shutters or expendable eye protecting goggles as well as photographic processes can employ phototropic materials of the irreversible type, such materials which will darken upon the application of light and/or heat and will not thereafter relax or become transparent, have been mentioned above in connection with a cupric chloride polyvinyl alcohol composition.

A highly efficient irreversible material may be made of complex poly acids in polyvinyl alcohol-acetate copolymer. Complex poly acids suitable for this material are: phosphomolybdic acid, silico-tungstic acid, phosphotungstic acid and the like.

A material comprising a solid solution of 30% phosphomolybdic acid and 70% polyvinyl alcohol-acetate copolymer shows an irreversible change in opacity on simple heating or exposure to intense light. This material is extremely suitable for irreversible opaquing uses since its transmittance changes from about 90% to less than .001% in the opaqued condition with remarkable uniformity throughout the entire spectrum from 300 to 1,000 mu. The mechanism of cupric chloride in this film increases the sensitivity. A film of this type may be used to shield eyes from sudden flashes and may be replaced after each exposure.

PHOTO-THERMOTROPIC FILM PHOTOGRAPHY

In addition to their light controlling properties the photo-thermotropic materials described herein display a further property, namely, a strong negative temperature coefficient of resistivity which depends upon the light energy impinging upon the film. The photo-thermotropic films therefore act as semi-conductors under the influence of light, and/or heat.

The unique properties of these films make it possible to produce grainless high resolution electro photo-thermotropic photographic films capable of taking pictures without recourse to customary developing techniques.

By simultaneously illuminating a film and applying a high frequency dielectric heating voltage across the film (as shown in FIGURE 5) a low intensity image falling upon the film which nevertheless produces variations in volume resistivity over the entire area of the film can cause selective opaquing of the film. The areas of the film with the brightest illumination will have the lowest local resistivity, the areas with the lower level illumination will have the highest local resistivity. Those areas of the film which are dark and have a high resistivity will heat very little but those which are brightly illuminated will heat more rapidly. If the film is irreversible a permanent "photograph" of the projected image may be made.

There is a regenerative effect which accelerates the heating of the brightly illuminated area by virtue of the negative coefficient of resistance of the material. This amplifies or accentuates the change in film transparency.

Thus, a comparatively low level of illumination which in itself is not sufficient to produce a marked change in transparency by photo-thermotropic action alone, is now capable of being amplified to produce an image by electro-photo-thermotropic action.

The film is grainless. The resolution is utimately limited to molecular dimensions which are of the order of less than 0.01 micron. This resolution exceeds the maximum requirement for all optical systems. The grainless film may be coated upon a paper in lieu of the transparent support 10 in FIGURE 1 to form an easily handled article.

Opaquing in the electro thermo-phototropic films described herein appears to be controlled by the total input of energy per unit volume of the film, which is substantially independent of time. However, the process is more efficient for short intervals since there is less opportunity for energy loss by radiation, conduction, etc.

RESINS

Other resins suitable for forming plastic matrices for reversible photo thermo-tropic reactions are: cellulose acetate, cellulose acetate hydrogen phthalate (CAHP), polyvinyl acetaldehyde, polyvinyl butyral, and the like.

HUMECTANT FILMS

The humectant films referred to herein may consist of polyvinyl alcohol and glycerine in equal parts which are cast into a thin film and exposed to a moist atmosphere of between 90% to 95% relative humidity before assembly. It will be understood that other well known moisture retaining and dissipating films capable of operating in the manner hereinabove described may be employed without departing from the spirit of the invention.

From the foregoing it will be seen that there has been provided phototropic compositions capable of substantially instantaneous opaquing upon exposure to light and/or heat. These compositions are both reversible and irreversible in nature and sufficiently rapid in their response to radiation to protect the eyes of a viewer from the effects of intense flashes of light. In addition, there has been disclosed various apparatus by means of which the response of the phototropic materials can be greatly enhanced. These devices may be used as windows, windshields, eye glasses or in any of the installations through which people must look. The devices are capable of responding both to high intensity and low level illuminants through the assistance of electrically controlled sources of potential which impress dielectric heating through conductive transparent films adjacent the phototropic compositions. It has also been shown how phototropic compositions made in accordance with the present invention may be employed in lieu of presently known photographic materials to produce images projected thereon.

Having thus fully described the invention, what is claimed as new and desired to be secured by Letters Patent of the United States, is:

1. A thermo-phototropic cell comprising spaced transparent plate-like members, a strip around the edges of the plate-like members to form a chamber between said plate-like members and a thermo-phototropic film comprising a solid solution of a transition metal halide in a polymer supported only at its edges within the chamber secured to the strip and means to apply heat to the thermo-phototropic film.

2. A cell according to claim 1 in which the heat applying means comprises at least one electrically conductive film within the chamber and a source of potential connected across the said electrically conductive film.

3. A thermo-phototropic cell comprising spaced transparent plate-like members, a strip around the edges of the plate-like members to form a chamber between said plate-like members and a thermo-phototropic film comprising a solid solution of a transition metal halide in a polymer supported only at its edges within a chamber secured to the strip, a humectant film on at least one of the surfaces of the plate-like members, and means to apply heat to the thermo-phototropic film, whereby moisture is expelled from the thermo-phototropic film and is absorbed by the humectant film.

4. A thermo-phototropic cell comprising spaced transparent plate-like members, a strip around the edges of the plate-like members to form a chamber between said plate-like members, a transparent electrically conductive film within the chamber, a thermo-phototropic film on the conductive film, humectant films on at least one of the surfaces of the plate-like members facing the thermo-phototropic film and means to apply electrical potential across the conductive film to heat the thermo-phototropic film whereby the application of additional energy will cause the film to darken rapidly.

References Cited by the Examiner

UNITED STATES PATENTS

| | | | |
|---|---|---|---|
| 1,880,449 | 10/1932 | Hickman et al. | 96—88 |
| 1,897,843 | 2/1933 | Hickman et al. | 96—88 |
| 2,109,235 | 2/1938 | Kott | 88—106 |
| 2,692,948 | 10/1954 | Lion | 250—65 |
| 2,700,610 | 1/1955 | Suchow et al. | 96—88 |
| 2,710,274 | 6/1955 | Kuehl | 88—106 |
| 2,747,999 | 5/1956 | Yutzy et al. | 96—29 |
| 2,764,693 | 9/1956 | Jacobs et al. | 250—65 |
| 2,971,840 | 2/1961 | Haydn et al. | 96—29 |
| 3,025,763 | 3/1962 | Schwartz et al. | 88—61 |
| 3,085,469 | 4/1963 | Carlson | 88—106 |

FOREIGN PATENTS

| | | |
|---|---|---|
| 702,000 | 1/1959 | Great Britain. |
| 228,239 | 11/1943 | Switzerland. |

JEWELL H. PEDERSEN, *Primary Examiner.*

MILTON STERMAN, *Examiner.*

A. LIBERMAN, R. L. WIBERT, *Assistant Examiners.*